United States Patent [19]

Kleinbohl

[11] 4,035,754
[45] July 12, 1977

[54] FUSE BOX, PARTICULARLY FOR MOTOR VEHICLES

[75] Inventor: Helmut Kleinböhl, Goddelau, Germany

[73] Assignee: General Motors Corporation, Detroit, Mich.

[21] Appl. No.: 689,572

[22] Filed: May 24, 1976

[30] Foreign Application Priority Data

June 6, 1975 Germany .......................... 2525241

[51] Int. Cl.² .................... H01H 85/30; B60Q 1/26
[52] U.S. Cl. ............................... 337/206; 337/242; 337/266; 340/80; 340/250
[58] Field of Search .......... 337/206, 216, 241, 242, 337/265, 266; 340/79, 80, 250, 251

[56] References Cited

U.S. PATENT DOCUMENTS

| | | | |
|---|---|---|---|
| 2,276,785 | 3/1942 | La Mar | 337/242 |
| 3,975,708 | 8/1976 | Lusk et al. | 340/80 |

*Primary Examiner*—Robert J. Hickey
*Attorney, Agent, or Firm*—Warren D. Hill

[57] ABSTRACT

Fuse boxes for motor vehicles, in which fuse elements are carried on a support plate mounted on a box containing a light source. Each fuse element has a region of small cross-section overlying a respective one of a plurality of apertures in the support plate. When the small cross-section region of a fuse element melts the underlying aperture is exposed. Light from the light source passes out through said aperture to illuminate a circuit symbol adjacent the support plate thereby giving a visible indication of fuse element failure.

3 Claims, 5 Drawing Figures

FUSE BOX, PARTICULARLY FOR MOTOR VEHICLES

This invention relates to fuse boxes for motor vehicles, utilizing meltable fuse elements on a support plate.

Prior to the present invention, failure of a fuse element was not always immediately apparent to the driver of the vehicle. Also, the driver, having found that a circuit had failed, would think that the device supplied by the circuit had failed, before establishing by checking the fuse box, that in fact it was the fuse for that circuit which had failed, and not the device itself.

It is an object of the present invention to provide a fuse box in which a visible indication is given of the failure of a fuse element, and if a fuse element fails, which one.

It is a further object of the invention to provide a fuse box having symbols identifying the circuit of each fuse element.

Other features, objects and advantages of this invention will become more apparent from the following detailed description and drawings in which.

Figure 1:
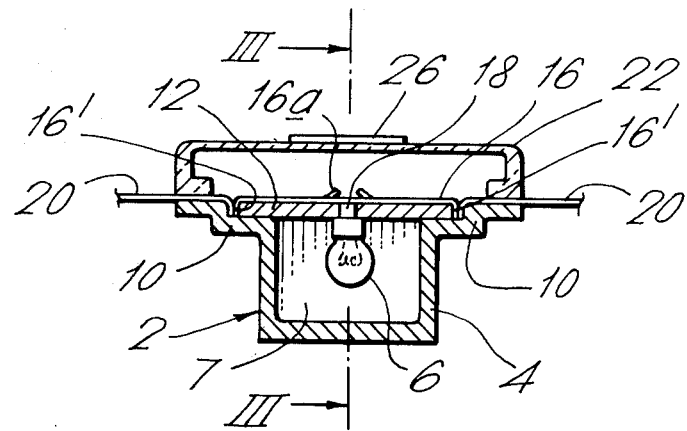
FIG. 1 is a cross-sectional view of one embodiment of a fuse box according to the invention.
Figure 2:
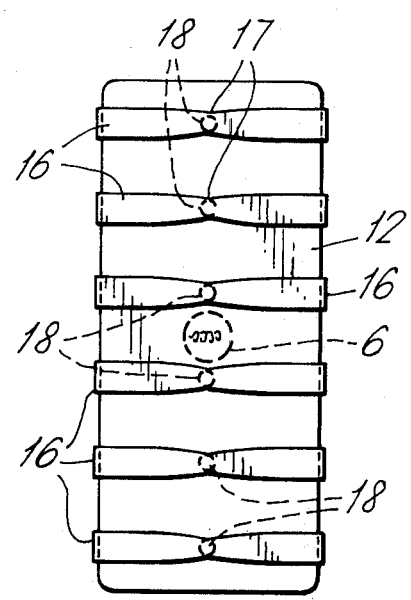
FIG. 2 is a top plan view of a support plate and fuse element thereon of the fuse box of FIG. 1.
Figure 3:
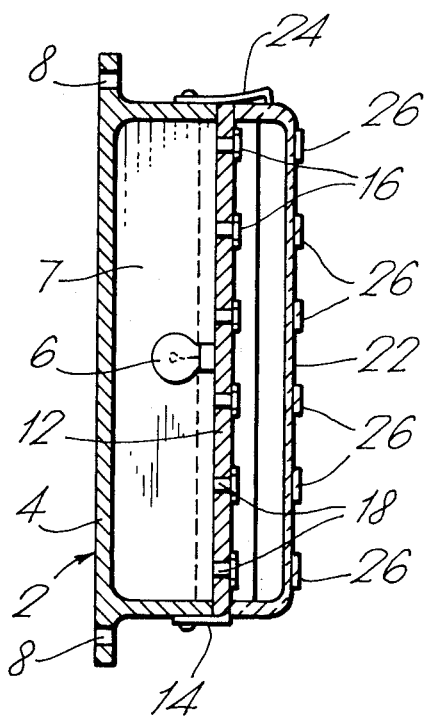
FIG. 3 is a sectional view of the FIG. 1 fuse box along the line III — III of that Figure.

FIGS. 1 and 3 of the drawings show a fuse box 2 for installation in a motor vehicle in a position within the vehicle driver's field of view. THe fuse box 2 comprises an oblong illumination housing 4 having one side open. This open side is closed by a support plate 12, of insulating material and shown in plan in FIG. 2. A bulb 6 is mounted in support plate 12 and extends into the housing 4. THe housing constitutes a light chamber 7. As best seen in FIG. 1, two sides of the housing 4, in this case the longer sides, each have out-turned stepped flange portions 10 upon which the support plate 12 seats to close the housing. The housing 4 is secured in the desired location in the vehicle by suitable means, as for example bolts inserted through apertures 8 in the housing (two such apertures being shown in FIG. 3) and received in suitable retainer means on the vehicle body. The support plate 12 is detachably secured on the housing 4 by suitable fastening means, one such means in the form of a resilient clip being shown in FIG. 3.

Strips of electrically conductive material, serving as fusible elements 16 are carried on the support plate 12. Each strip 16 has bent-over end portions 16' which engage side portions of the support plate 12. Intermediate its length each strip has a waisted portion or region 17 of small cross-section which overlies a respective one of a plurality of apertures 18 in the support plate 12. Contact between each fuse element 16 and its circuit element may be achieved in a number of ways as best suits the requirements of the particular installation contemplated. As shown in FIG. 1 the bent-over ends 16' of each fuse element 16 abut respective conductor strip portions 20 of the circuit utilizing that fuse.

A cover 22 of transparent material overlies the support plate 12 and fuse elements 16, and is releasably secured to the housing 4 by suitable means, for example snap-action catches, one such being shown at 24 in FIG. 3. The cover 22 bears indicia 26 respectively identifying the circuit protected by each fuse element. As shown in FIGS. 1 and 3 the indicia comprise individual circuit-identifying strips 26 superposed on the outer surface of the cover, each strip overlying its respective fuse element. When a fuse element melts through, as indicated schematically at 16a in FIG. 1, light from the bulb 6 passes through the aperture 18, now no longer covered or masked by the fuse element, and illumines the appropriate strip 26 to thereby provide a visual indication of the melted fuse element.

In the embodiment described above with reference to FIGS. 1 through 3 of the drawings, when a fuse element needs to be replaced the support plate 12 is removed and a fresh support plate with intact fuses is inserted in its place. However, where desired, individual fuse elements could be replaced instead of replacing the support plate 12 and fuse elements 16 as a unit.

Current for bulb 6 could be supplied by way of printed circuit means on the support plate 12. The supply of current to the bulb 6 could be arranged as best suits the particular installation of the fuse box, for example it could be arranged that the bulb 6 is lit whenever the vehicle ignition is switched on, or alternatively, the bulb 6 could always be in a live circuit supplied from the vehicle battery.

Figure 4:
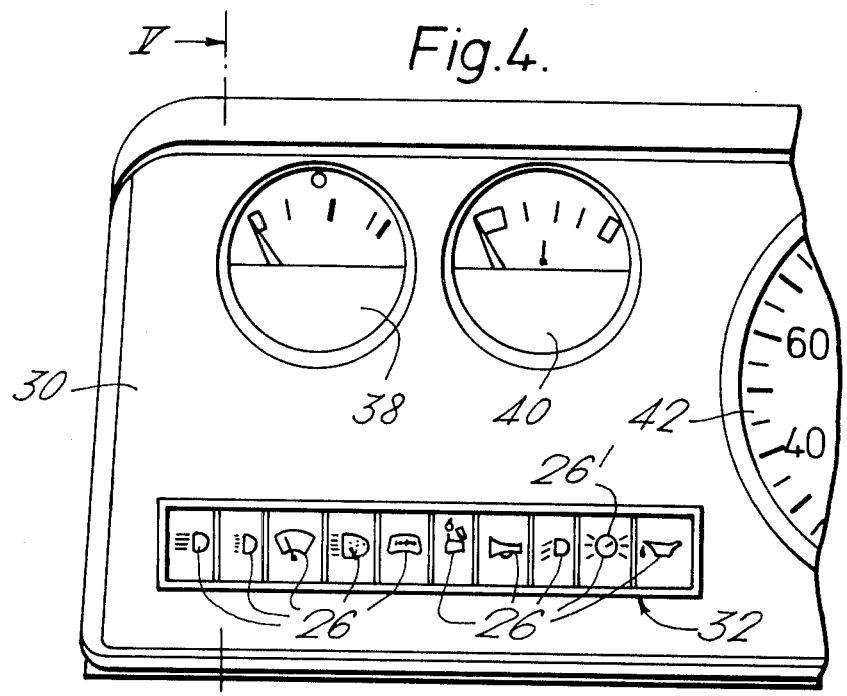
FIG. 4 is a front view of part of a motor vehicle instrument panel including a second embodiment of a fuse box according to the invention; and, FIG. 5 is a sectional view on the line V — V of FIG. 4.
Figure 5:
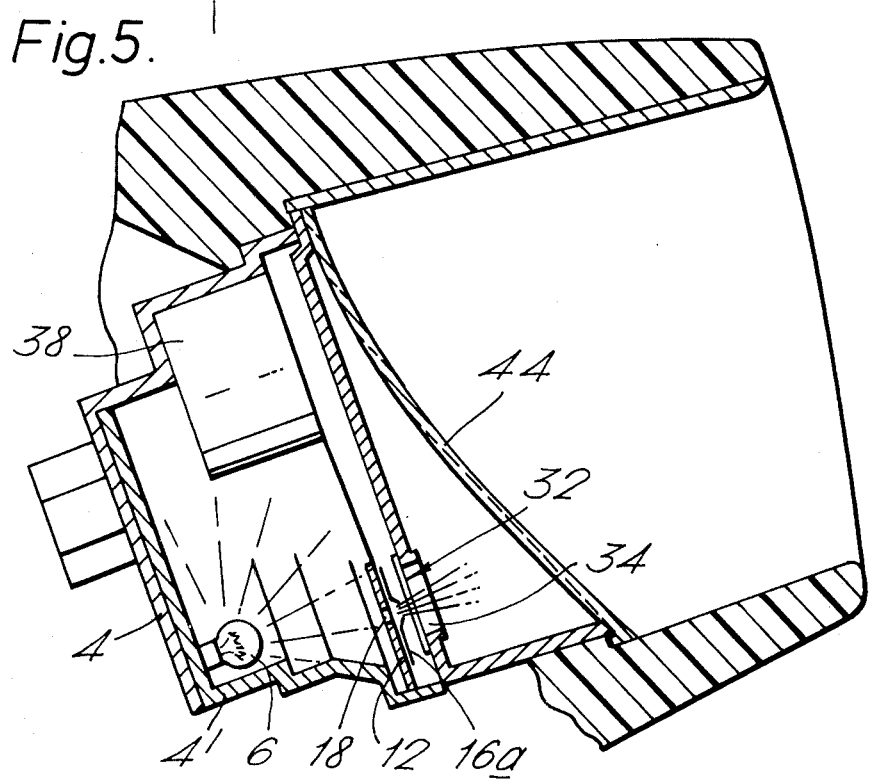

FIGS. 4 and 5 illustrate a second embodiment of a fuse box according to this invention, in this case the fuse box is installed at the instrument panel. In this embodiment like parts have the same numerals as in the first-described embodiment. As seen in FIG. 5 the fuse box housing is in two parts 4, 4' with the base portion of one part 4', seated on the base portion of the other part 4. The housing is located at the rear of the instrument panel 30 and is secured thereto in any convenient manner permitting easy withdrawal of the housing for access to the bulb 6, which is mounted on the base portion of part 4' of the housing. The instrument panel 30 has a rectangular cut-out portion 34 behind which is mounted a symbol screen 32, having symbols 26, thereon for the individual circuits in which the fuse elements are utilized. A support plate 12 mounted on the instrument panel 30 and behind the symbol screen 32 carries the fuse elements 16, and in FIG. 5 one of these is shown melted, as element 16a. As in the first embodiment, each fuse element has a region of small cross-section forming the melt region of the element and overlying a respective one of a plurality of apertures in the support plate 12. The instrument panel has, as shown in FIG. 4 indicating instruments 38, 40 and 42 mounted thereon for the fuel tank contents, the engine temperature, and vehicle speed respectively. An instrument cover in the form of a curved sheet 44 of transparent material for example glass, is fitted to the instrument panel in front of the instruments.

As in the first-described embodiment, when a fuse element melts it exposes the underlying aperture in the support plate 12, light from the bulb 6 shines through the aperture and illuminates the appropriate symbol on the symbol screen 32 for that fuse element circuit. One such illuminated symbol is indicated as 26' in FIG. 4.

In FIG. 5 the parts comprising the fuse box, that is the housing 4, 4' the support plate 12, and symbol screen 32 are each secured to the instrument panel. However, where desired the fuse box could be assembled as a unit first and then installed at the instrument panel.

I claim:

1. A fuse box for a motor vehicle providing an illuminated indication of a melted fuse comprising
a support plate mounted on the vehicle, a plurality of apertures through the support plate,
illumination means on a first side of the plate for providing light to the apertures,
a plurality of meltable fuse elements on the plate, the fuse elements normally covering each of the apertures respectively to block the light through the apertures, whereby a lighted aperture is exposed when its corresponding fuse element melts to provide at the second side of the plate an illuminated indication of the fuse melted condition.

2. A fuse box for a motor vehicle for providing an illuminated indication of a melted fuse comprising
a support plate mounted on the vehicle, a plurality of apertures through the support plate,
an illumination housing containing a light source on a first side of the plate for providing light to the apertures,
a plurality of meltable fuse elements on the plate, each fuse element having a region of small cross-section, the small cross-section region of the fuse elements normally covering each of the apertures respectively to block the light through the apertures, whereby a lighted aperture is exposed when its corresponding fuse element melts to provide at the second side of the plate an illuminated indication of the fuse melted condition.

3. A fuse box for a motor vehicle for providing an illuminated indication of a melted fuse comprising
a support plate mounted on the instrument panel of the vehicle, a plurality of apertures through the support plate,
illumination means on a first side of the plate for providing light to the apertures,
a plurality of meltable fuse elements on the plate, each fuse element being a part of a vehicle circuit, the fuse elements normally covering each of the apertures respectively to block the light through the apertures,
a translucent cover plate disposed over the second side of the support plate and symbols on the cover plate aligned with the fuse elements and identifying the circuit of each fuse element,
whereby a lighted aperture is exposed and a symbol on the cover plate is illuminated when its corresponding fuse element melts to provide an illuminated indication of the fuse melted condition.

* * * * *